(12) United States Patent
Dubois et al.

(10) Patent No.: US 12,392,710 B2
(45) Date of Patent: Aug. 19, 2025

(54) MULTIPLE CHANNEL LASER ULTRASONIC SYSTEM

(71) Applicant: THE BOEING COMPANY, Arlington, VA (US)

(72) Inventors: Marc Dubois, Issaquah, WA (US); Jill P. Bingham, Seattle, WA (US)

(73) Assignee: The Boeing Company, Arlington, VA (US)

( * ) Notice: Subject to any disclaimer, the term of this patent is extended or adjusted under 35 U.S.C. 154(b) by 246 days.

(21) Appl. No.: 18/191,788

(22) Filed: Mar. 28, 2023

(65) Prior Publication Data
US 2024/0328926 A1    Oct. 3, 2024

(51) Int. Cl.
*G01N 21/17*    (2006.01)
(52) U.S. Cl.
CPC . *G01N 21/1702* (2013.01); *G01N 2021/1706* (2013.01); *G01N 2201/06113* (2013.01); *G01N 2201/0636* (2013.01); *G01N 2201/08* (2013.01); *G01N 2201/10* (2013.01)
(58) Field of Classification Search
CPC .......... G01N 21/1702; G01N 21/1704; G01N 21/1706; G01N 2021/1706; G01N 2201/06113; G01N 2201/0636; G01N 2201/08; G01N 2201/10; G01N 29/265; G01N 29/2418; G01N 2291/0231; G01N 2291/106; G01N 2291/2694
See application file for complete search history.

(56) References Cited

U.S. PATENT DOCUMENTS

| | | | | |
|---|---|---|---|---|
| 6,092,419 | A | * | 7/2000 | Dixon ................ G01N 29/0681 73/602 |
| 6,128,081 | A | | 10/2000 | White et al. |
| 11,287,507 | B2 | | 3/2022 | Motzer et al. |
| 2021/0404948 | A1 | * | 12/2021 | Haji Reza .......... G01N 21/1702 |

FOREIGN PATENT DOCUMENTS

| | | |
|---|---|---|
| EP | 1007942 A1 | 6/2000 |
| EP | 2132560 A1 | 12/2009 |

OTHER PUBLICATIONS

European Patent Office, Extended European Search Report for European Patent Application No. 24154697.7, mailed May 7, 2024.

(Continued)

*Primary Examiner* — Suman K Nath
(74) *Attorney, Agent, or Firm* — Walters & Wasylyna LLC

(57) ABSTRACT

The present disclosure provides for a multiple channel laser ultrasonic system using a single detection laser and a single generation laser for inspecting internal structures. An example system includes a laser generator configured to emit generation laser light, a laser detector configured to emit detection laser light, and a scanning apparatus. The scanning apparatus is configured to receive the generation laser light and the detection laser light, direct the generation laser light and the detection laser light onto a surface of a structure via a plurality of laser ultrasonic channels, and collect reflections of the detection laser light from the surface of the structure via the plurality of laser ultrasonic channels. The system also includes a controller configured to characterize an internal feature of the structure based on the reflections.

20 Claims, 6 Drawing Sheets

(56) References Cited

OTHER PUBLICATIONS

M. Dubois, T.C. Burke, T.E. Drake, "Laser phase noise reduction for industrial interferometric applications", Appl. Opt., 43, 4399-4407, 2004. [Abstract Only].

T.E. Drake, "Large Area Composite Inspection System," Air Force Research Laboratory, Report AFRL-ML-WP-TR-1998-4128, Contract F33615-92-C-5981, 1998.

J.-P. Monchalin, C. Néron, J.F. Bussière, P. Bouchard, C. Padioleau, R. Héon, M. Choquet, J.-D. Aussel, G. Durou, J.A. Nilson, "Laser-Ultrasonics: From the Laboratory to the Shop Floor", Advanced Performance Materials 5, 7-23, 1998.

B. Campagne, H. Voillaume, L. Gouzerh, F. Bentouhami, "Laser Ultrasonic Developments for NDT of Aeronautic Composite Parts", 13th Int. Symp. Nondest. Char. Mat. (NDCM-XIII) , 2013.

M. Dubois, T.E. Drake, M.A. Osterkamp, "Low-Cost Ultrasonic Inspection of Composites for Aerospace Applications with LaserUT® Technology", Jap. J. NDI., 57, 1, 2008.

R.A. Canfield, J. Ahrens, J. Bingham, B. Fetzer, T. Müller-Wirts, M. O'Donnell , G. Georgeson, I. Pelivanov, "Distance and Angle Correction System (DACS) for a kHz A-Scan Rate Pump-Probe Laser-Ultrasound Inspection", Sensors, 20, 7266, 2020.

A. Blouin, D. Drolet, J.P. Monchalin, "Ultrasonic Detection System Based on Two-Wave Mixing in Photorefractive GAAS Crystal", Rev. Prog. QNDE, vol. 14, (1995). [Abstract Only].

\* cited by examiner

MULTIPLE CHANNEL LASER ULTRASONIC SYSTEM

FIELD

The present disclosure relates to a laser ultrasound inspection system. More particularly, the present disclosure relates to a multiple channel laser ultrasonic system using a single detection laser and a single generation laser for inspecting internal structures of a component.

BACKGROUND

In manufacturing aircraft, vehicles, and other structures, inspection of parts used to form these structures is often performed to determine whether the parts have appropriate parameters and properties for desired functions and performance. Additionally, the structures and/or parts may be inspected as part of normal maintenance. Nondestructive inspection is commonly used to evaluate the properties of a part without altering the ability of the part to be used for its desired function. Examples of nondestructive inspection include ultrasound testing, eddy current testing, x-ray testing, and visual inspections.

Ultrasound testing is often used to perform inspections on aircraft parts that are formed of composite materials. Ultrasound testing involves transmitting acoustic waves (e.g., sound waves) through a test object and detecting a response to the acoustic waves. The response is analyzed to determine whether inconsistencies or defects are present in the test object.

Ultrasound testing is commonly performed using a transducer that is configured to send acoustic waves into the test object and detect the response to the acoustic waves. Typically, the transducer is coupled to a surface of the test object by placing the transducer in physical contact with the test object. In many cases, a coupling medium, such as water, oil, a water-based gel, or some other liquid, is used to reduce the acoustic impedance between the transducer and the test object. However, in many cases, coupling the transducer to the surface of the test object may be difficult and complex. For example, when the test object has a non-constant geometry, a non-planar surface, or other non-planar features, it may be difficult and complex to couple the transducer to the test object in a manner that ensures that sound enters the test object in a desired direction, such as perpendicular to the surface.

Laser ultrasound testing is an example of non-destructive inspection that allows for inspection of the test object without requiring physical contact with the test object. Typically, laser ultrasound testing uses a laser beam to generate ultrasonic waves in the test object and another separate laser beam to detect a response to the ultrasonic waves to generate data about the test object.

Compared to ultrasonic testing systems, laser ultrasound testing systems are generally less sensitive to the orientation relative to the test object. However, it can take a significant amount of time to perform testing of composite materials used in certain structures, such as aircraft, with laser ultrasound testing systems. For example, the laser in laser ultrasound testing systems generally limit the rate of data acquisition, which tends to make such systems too expensive, slow, and bulky to be suitable for manufacturing inspection systems.

SUMMARY

One embodiment of the present disclosure is a system. The system includes a laser generator, a laser detector, a scanning apparatus, and a controller. The laser generator is configured to emit generation laser light. The laser detector is configured to emit detection laser light. The scanning apparatus is configured to: receive the generation laser light and the detection laser light; direct the generation laser light and the detection laser light onto a surface of a structure via a plurality of laser ultrasonic channels; and collect reflections of the detection laser light from the surface of the structure via the plurality of laser ultrasonic channels. The controller is coupled to the laser generator, the laser detector, and the scanning apparatus. The controller is configured to characterize an internal feature of the structure based on the reflections.

Another embodiment of the present disclosure is a method. The method includes generating, via a first plurality of beam splitters, a plurality of generation laser light beams from an emitted generation laser light. The method also includes generating, via a second plurality of beam splitters, a plurality of detection laser light beams from an emitted detection laser light. The method also includes, for each of a plurality of laser ultrasonic channels, (i) directing a respective one of the plurality of generation laser light beams and a respective one of the plurality of detection laser light beams to a surface of a structure via the laser ultrasonic channel and (ii) collecting one or more reflections of the respective one of the plurality of detection laser light beams via the laser ultrasonic channel. The method further includes characterizing an internal feature of the structure based on the reflections.

Another embodiment of the present disclosure is a laser ultrasonic system. The laser ultrasonic system includes a scanning head and a robotic arm coupled to the scanning head. The scanning head includes a laser generator configured to emit generation laser light, and a laser detector configured to emit detection laser light. The scanning head is configured to receive the generation laser light and the detection laser light. The scanning head is also configured to direct the generation laser light and the detection laser light onto a surface of a structure via a plurality of laser ultrasonic channels. The scanning head is further configured to collect reflections of the detection laser light from the surface of the structure via the plurality of laser ultrasonic channels.

BRIEF DESCRIPTION OF THE DRAWINGS

So that the manner in which the above recited features can be understood in detail, a more particular description, briefly summarized above, may be had by reference to example embodiments, some of which are illustrated in the appended drawings.

DETAILED DESCRIPTION

The present disclosure provides for ultrasound testing of various components using a laser ultrasonic (LUT) system, which includes multiple data acquisition channels, a single generation laser, and a single detection laser. In certain embodiments, the LUT system is used for ultrasonic inspection of polymer-matrix composites during aircraft manufacturing. The LUT system described herein can significantly increase ultrasonic inspection speeds when scanning composite materials, increase signal quality, and maintain the cost of inspection low, relative to conventional laser ultrasonic inspection systems.

For example, in certain embodiments, the LUT system includes an inspection or scanning head that shares the generation and detection laser beams from a single generation laser and a single detection laser, respectively, among multiple channels. Using a single generation laser and a single detection laser enables a laser ultrasonic system to use higher quality, higher power lasers, while minimizing the capital cost per channel because the cost per unit of power is generally lower for industrial lasers relative to smaller custom-type lasers or diode lasers. In particular, for multiple-channel LUT systems, if a single industrial laser can be shared between multiple channels, the total system cost for such an approach becomes similar to an approach that uses smaller lasers.

Additionally, more power may be available with a LUT system with multiple channels, because industrial lasers have a lower cost per unit of laser power, relative to smaller lasers. More power, in turn, may translate into a higher quality signal (e.g., a larger signal-to-noise ratio (SNR)). The higher quality signals may translate into a better incidence angle tolerance and longer depth of fields, which in turn can result in a larger range of possible applications and higher manufacturing throughput.

Figure 1:
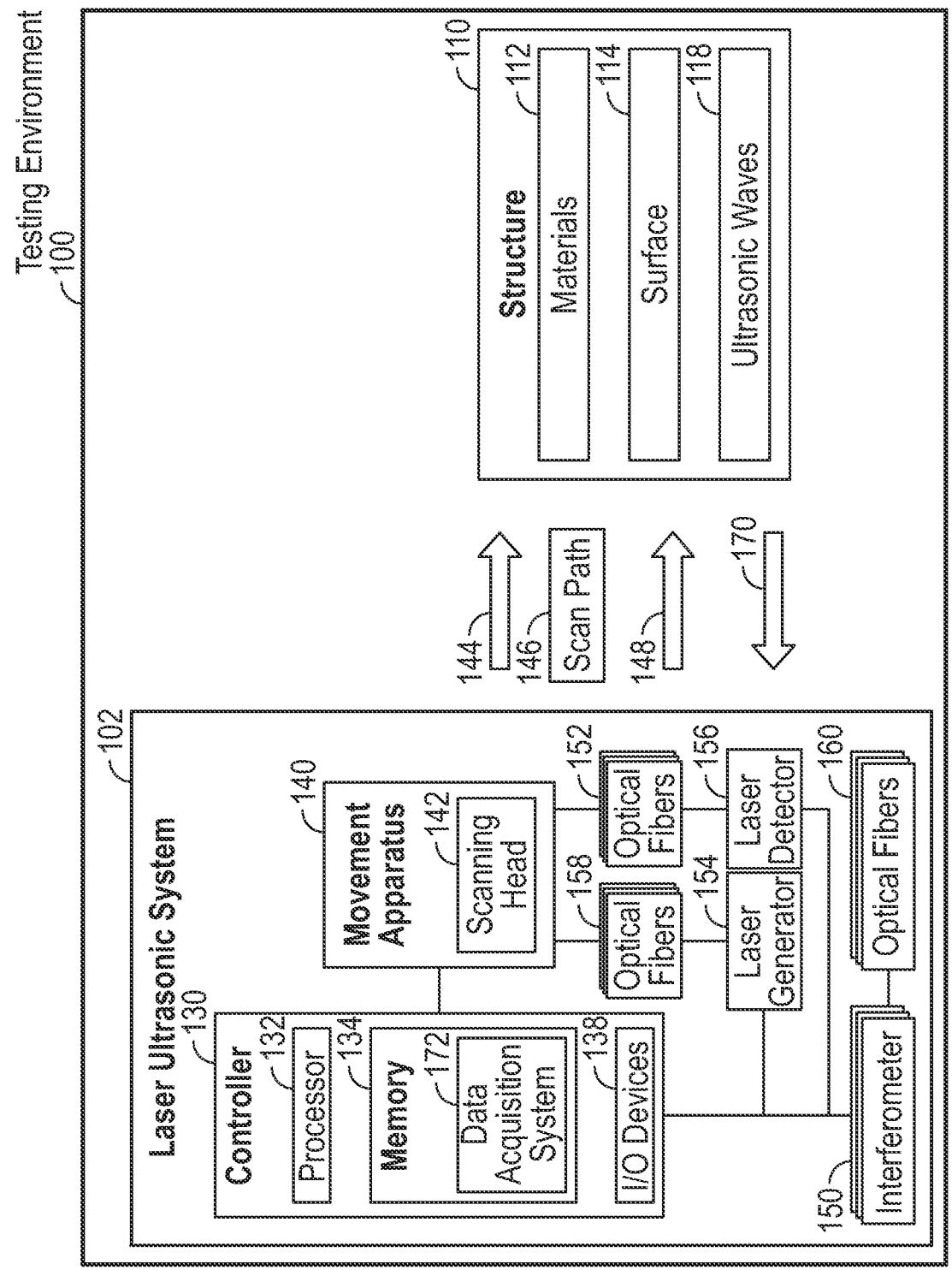
FIG. 1 is a block diagram illustrating an example testing environment, according to one embodiment.

FIG. 1 is a block diagram illustrating an example testing environment 100, according to certain embodiments. The testing environment 100 includes a LUT system 102, which is used to test a structure 110. The structure 110 is generally representative of any article or object that is to be tested using the LUT system 102. For example, the structure 110 may include materials or components of an aircraft, vehicle, ship, or other structures.

The LUT system 102 includes a controller 130, a movement apparatus 140, a (single) laser generator 154, a (single) laser detector 156, one or more optical fibers 158, one or more optical fibers 152, one or more interferometers 150, and one or more optical fibers 160. The controller 130 is generally configured to control one or more components of the LUT system 102, including, for example, the movement apparatus 140, laser generator 154, laser detector 156, and interferometer(s) 150.

The controller 130 includes a processor 132, a memory 134, and one or more input/output (I/O) devices 138. The processor 132 is any electronic circuitry, including, but not limited to one or a combination of microprocessors, microcontrollers, application specific integrated circuits (ASIC), application specific instruction set processor (ASIP), and/or state machines, that communicatively couples to memory 134 and controls the operation of the LUT system 102. The processor 132 may be 8-bit, 16-bit, 32-bit, 64-bit or of any other suitable architecture. The processor 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 132 may include other hardware that operates software to control and process information. The processor 132 executes software stored on the memory 134 to perform any of the functions described herein. The processor 132 controls the operation and administration of the controller 130 by processing information (e.g., information received from the processor 132, memory 134, and/or I/O devices 138). The processor 132 is not limited to a single processing device and may encompass multiple processing devices.

The memory 134 may store, either permanently or temporarily, data, operational software, or other information for the processor 132. The memory 134 may include any one or a combination of volatile or non-volatile local or remote devices suitable for storing information. For example, the memory 134 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 134, a disk, a CD, or a flash drive. In particular embodiments, the software may include an application executable by the processor 132 to perform one or more of the functions described herein. Here, the memory 134 includes a data acquisition system 172, which is described in greater detail herein. The I/O devices 138 may include, but are not limited to, one or more of a keypad, a keyboard, a touch-sensitive display screen, a liquid crystal display (LCD) screen, a microphone, a speaker, a communication port, or any combination thereof.

The laser generator 154 is configured to emit generation laser light 144. In certain embodiments, the generation laser light 144 emitted from the laser generator 154 is in the form of a laser pulse. Note, however, that the laser generator 154 can emit generation laser light 144 with any duration, frequency, and power. The laser detector 156 is configured to generate detection laser light 148. In certain embodiments, the laser detector 156 generates the detection laser light 148 to illuminate the surface 114 of the structure 110 where surface displacements associated with ultrasonic waves are expected to occur. The laser detector 156 can be a continuous laser or long pulsed laser. Note, however, that the laser detector 154 can emit detection laser light 148 with any duration, frequency, and power. In certain embodiments, one or more parameters of the generation laser light 144 and/or the detection laser light 148 may be based on the materials 112 used to form the structure 110.

The movement apparatus 140 includes a scanning head 142, which is generally configured to position and focus the generation laser light 144 (emitted from the laser generator 154) and the detection laser light 148 (emitted from the laser detector 156) onto the structure 110. The scanning head 142 may receive the generation laser light 144 via one or more optical fibers 158, optics, or a combination thereof. Similarly, the scanning head 142 may receive the detection laser light 148 via one or more optical fibers 152, optics, or a combination thereof. The scanning head 142 may include an optical scanner, a mirror scanner, or another type of scanner. In one embodiment, scanning head 142 may not include a scanner, in which case scanning may be accomplished by movement apparatus 140 moving scanning head 142.

In certain embodiments, one or more components of the LUT system 102 are mounted, or partially mounted, in the scanning head 142. In one example, the scanning head 142 may include the laser generator 154 and the laser detector 156. In another example, at least one of the laser generator 154 or the laser detector 156 can be partially mounted in the scanning head 142. In another example, the laser generator 154 may receive the generation laser light 144 through optics, optical fiber(s) 158, or a combination thereof, and the laser detector 156 may receive the detection laser light 148 through optics, optical fiber(s) 152, or a combination thereof.

The movement apparatus 140 can move the scanning head 142 in relation to the structure 110. For example, the controller 130 can control the movement apparatus 140 so that the generation laser light 144 and detection laser light 148 moves over the structure 110 along a scan path 146. In certain embodiments, the movement apparatus 140 is a robot, a robotic arm, or a gantry. In addition to, or as an alternative to, the movement apparatus 140 moving the scanning head 142, the scanning head 142 can move the generation laser light 144 and/or the detection laser light 148 at the surface 114 of the structure 110 to inspect an area of the structure 110 for a given position of the scanning head 142. In embodiments where the scanning head 142 is not able to perform scanning, the scanning may be achieved by movements of the movement apparatus 140.

In certain embodiments, the generation laser light 144 is absorbed at the surface 114 of the structure 110. The absorption of the generation laser light 144 creates a sudden localized thermal expansion that sends ultrasonic waves 118 into the structure 110. The ultrasonic waves 118 may be sent in a direction that is normal relative to the surface 114 of the structure 110, notwithstanding the incidence angle of the generation laser light 144.

In certain embodiments, the detection laser light 148 illuminates the surface 114 of the structure 110 where surface displacements associated with the ultrasonic waves 118 are expected to occur. The detection laser light 148 is reflected off the surface 114 of the structure 110 (shown as reflected detection laser light 170). The reflected detection laser light 170 may be collected by a set of collection optics (not shown) and may be received by one or more interferometers 150 via one or more optical fibers 160. The interferometer(s) 150 may demodulate the reflected detection laser light 170 to extract an ultrasonic signal. The interferometer(s) 150 are representative of different types of interferometers, including, for example, confocal Fabry-Perot interferometers, photorefractive interferometers, and fiber-based Sagnac interferometers. The interferometer(s) 150 may be integral or external to the scanning head 142. The controller 130, via the data acquisition system 172, may analyze the extracted ultrasonic signal to determine whether a defect is present in the structure 110.

Figure 2:
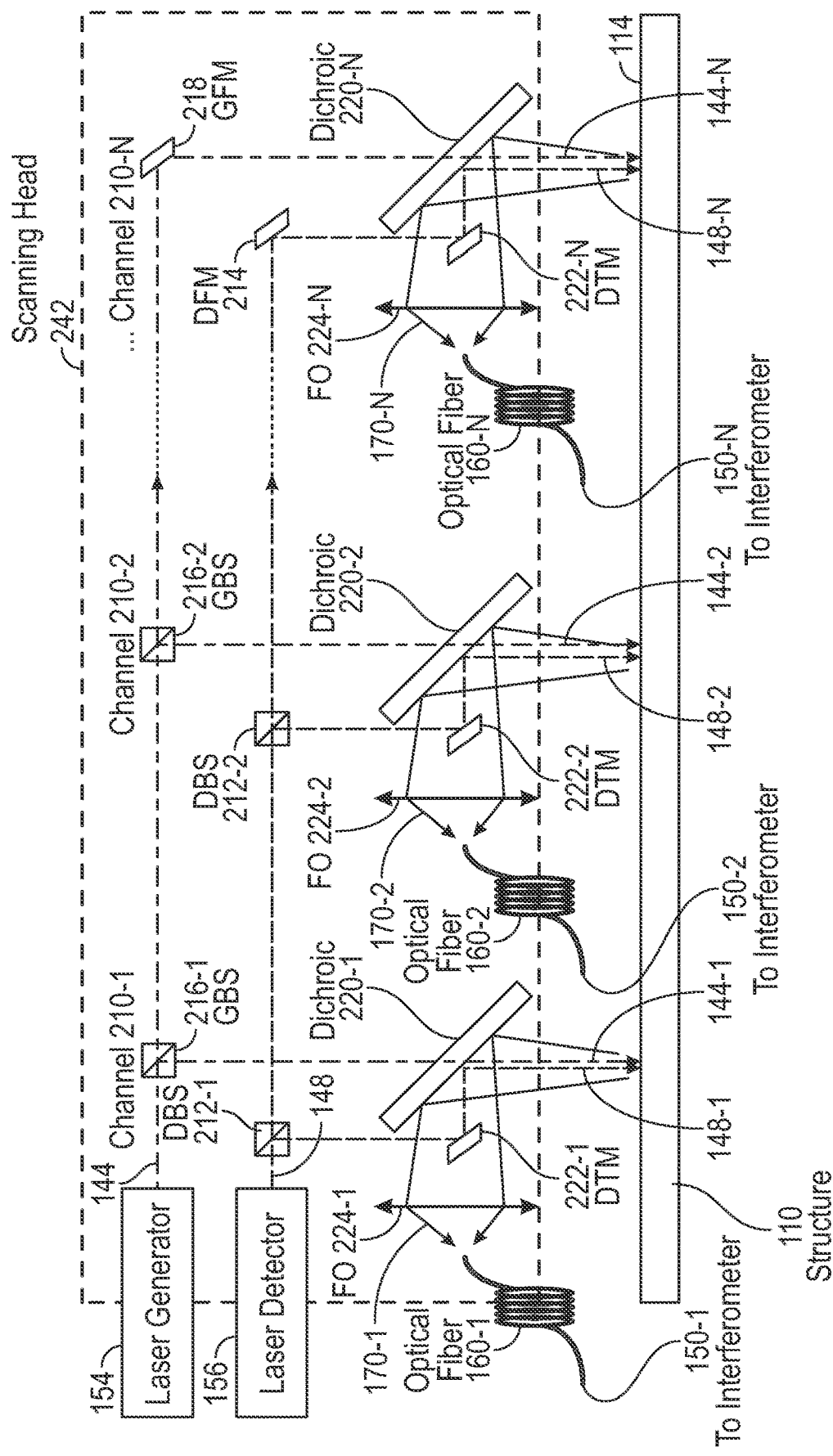
FIG. 2 illustrates an example scanning head for a laser ultrasonic system, according to one embodiment.

FIG. 2 illustrates an example scanning head 242 of a LUT system 102, according to one embodiment. The scanning head 242 is an example implementation of the scanning head 142 illustrated in FIG. 1. In this embodiment, the laser generator 154 and the laser detector 156 are located within the scanning head 242. In another embodiment, at least one of the laser generator 154 or the laser detector 156 is partially located in the scanning head 242. In yet another embodiment, the laser generator 154 and the laser detector 156 are optically coupled using moving mirrors, articulated mirrors, or a combination of moving and articulated mirrors.

As shown, the scanning head 242 includes multiple channels 210 1-N. The generation laser light 144 emitted from the laser generator 154 is directed towards a (first) LUT channel 210-1. A (first) generation beam splitter (GBS) 216-1 reflects a fraction of power of the original generation laser light 144 towards the surface 114 of the structure 110 through a (first) Dichroic 220-1 as generation laser light 144-1, and the rest of the power of the generation laser light 144 is directed towards a (second) LUT channel 210-2. A (second) GBS 216-2 reflects another fraction of the remaining power of the generation laser light 144 towards the surface 114 of the structure 110 through a (second) Dichroic 220-2 as generation laser light 144-2, and the rest of the power of the power of the generation laser light 144 is directed towards a (third) LUT channel (not shown). This pattern is repeated until the remaining power of the generation laser light 144 reaches the last ($N^{th}$) LUT channel 210-N, where the generation laser light is completely reflected by a generation final mirror (GFM) 218 towards the surface 114 of the structure through a ($N^{th}$) Dichroic 220-N as generation laser light 144-N.

As also shown in FIG. 2, the detection laser light 148 emitted from the laser detector 156 is directed towards the (first) LUT channel 210-1. A (first) detection beam splitter (DBS) 212-1 reflects a fraction of power of the original detection laser light 148 towards a (first) detection turning mirror (DTM) 222-1, and the rest of the power of the detection laser light 148 is directed towards a (second) LUT channel 210-2. The DTM 222-1 reflects the fraction of power of the original detection laser light 148 towards Dichroic 220-1, which, in turn, reflects the fraction of power of the original detection laser light 148 towards the surface 114 of the structure 110 as detection laser light 148-1.

A (second) DBS 212-2 reflects another fraction of power of the remaining detection laser light 148 towards a (second) DTM 222-2, and the rest of the power of the detection laser light 148 is directed towards a (third) LUT channel (not shown). The DTM 222-2 reflects the other fraction of power of the remaining detection laser light 148 towards Dichroic 220-2, which, in turn, reflects the other fraction of power of the remaining detection laser light 148 towards the surface 114 of the structure 110 as detection laser light 148-2. This pattern is repeated until the remaining power of the detection laser light 148 reaches the last ($N^{th}$) LUT channel, where the detection laser light 148 is completely reflected by a detection final mirror (DFM) 214 towards an ($N^{th}$) DTM 222-N. The DTM 222-N then reflects the remaining power of the detection laser light 148 towards Dichroic 220-N, which, in turn, reflects the remaining power of the detection laser light 148 towards the surface 114 of the structure 110 as detection laser light 148-N.

The detection laser light 148 1-N is scattered or reflected by the surface 114 as reflected detection laser light 170 1-N, respectively. The reflected detection laser light 170 1-N is reflected by the Dichroic 220 1-N towards focusing optics (FO) 224 1-N, respectively. The FO 224 1-N focus the reflected detection laser light 170 1-N into optical fibers 160 1-N, respectively. The optical fibers 160 1-N transmit the reflected detection laser light 170 1-N to interferometers 150 1-N, respectively. As noted, the interferometers 150 may be located within the scanning head 242, within the movement apparatus 140, or elsewhere within the testing environment 100.

In FIG. 2, the generation laser light 144 and detection laser light 148 of all the LUT channels 210 can be made collinear or non-collinear. In general, the generation laser light 144 and detection laser light 148 may form a pattern of inspection spots at the surface 114 of the structure 110, such that when a movement apparatus 140 moves the scanning head 142, the inspection rate of the structure 110 is increased by a factor equal to the number of LUT channels 210 in the scanning head 142, relative to a scanning head containing a single LUT channel.

In certain embodiments, the DBSs 212 and GBSs 216 have different characteristics so that the power of the generation laser light 144 and power of the detection laser light 148 are approximately the same for all the LUT channels 210. In general, the generation laser light 144 and detection laser light 148 can be varied in any suitable manner in order to create a target number of inspection spots at one or more target locations of the structure 110.

Figure 3:
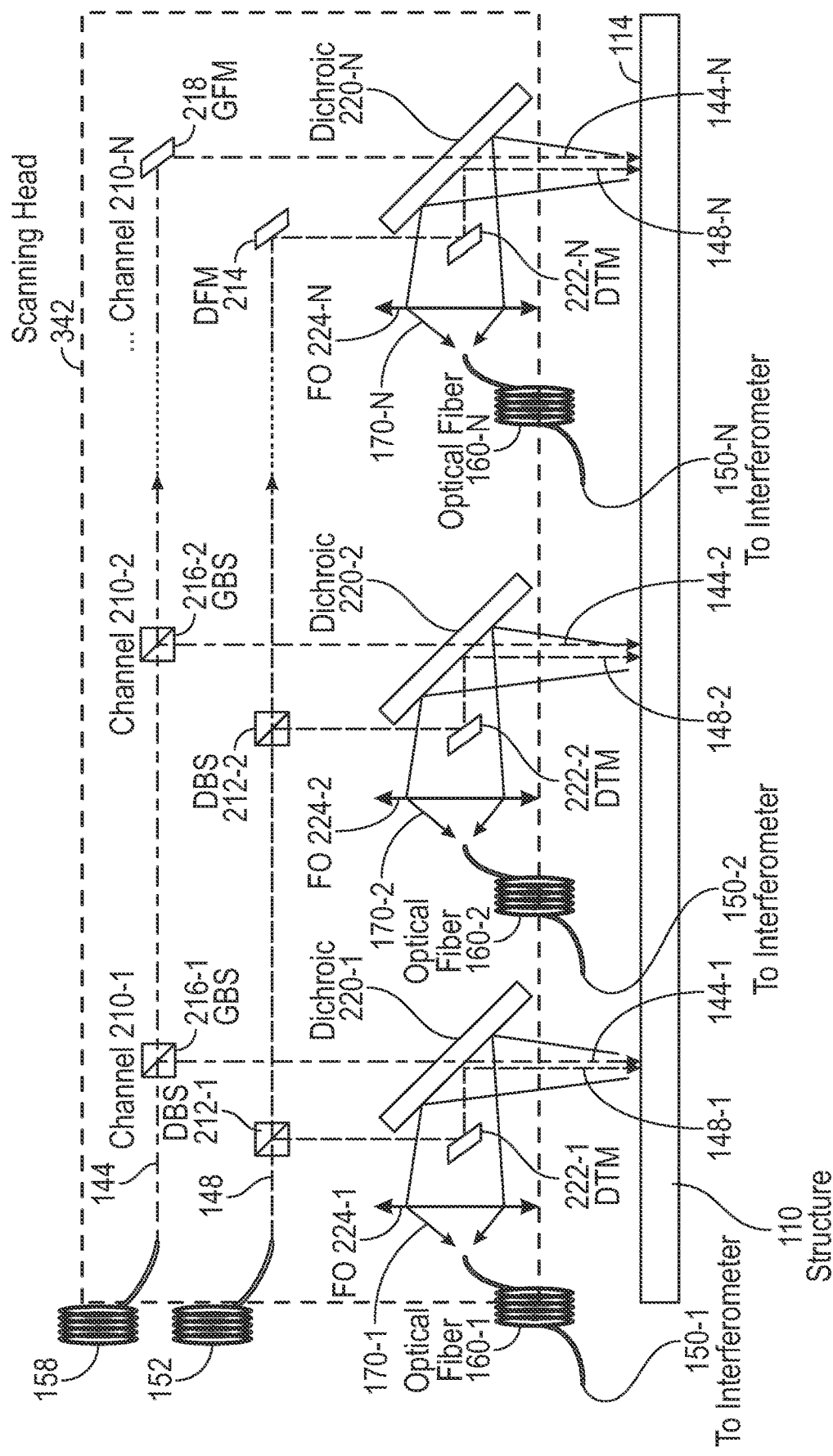
FIG. 3 illustrates another example scanning head for a laser ultrasonic system, according to one embodiment.

FIG. 3 illustrates an example scanning head 342 of a LUT system 102, according to one embodiment. The scanning head 342 is an example implementation of the scanning head 142 illustrated in FIG. 1. Compared to the scanning head 242, the scanning head 342 does not include the laser generator 154 and the laser detector 156. That is, the generation laser light 144 and the detection laser light 148 are not generated within the scanning head 342.

For example, as shown in FIG. 3, the generation laser light 144 emitted from the laser generator 154 and the detection laser light 148 emitted from the laser detector 156 are brought to the scanning head 342 by optical fibers 158 and 152, respectively. Once the generation laser light 144 and detection laser light 148 exit the optical fibers 158 and 152, respectively, the generation laser light 144 and detection laser light 148 may follow a pattern similar to that depicted in FIG. 2. Note that while FIG. 3 depicts both generation laser light 144 and detection laser light 148 being brought to the scanning head via respective optical fibers 158 and 152, in certain embodiments, at least one of the generation laser light 144 or the detection laser light 148 may be brought to the scanning head 342 by a respective optical fiber.

Figure 4:
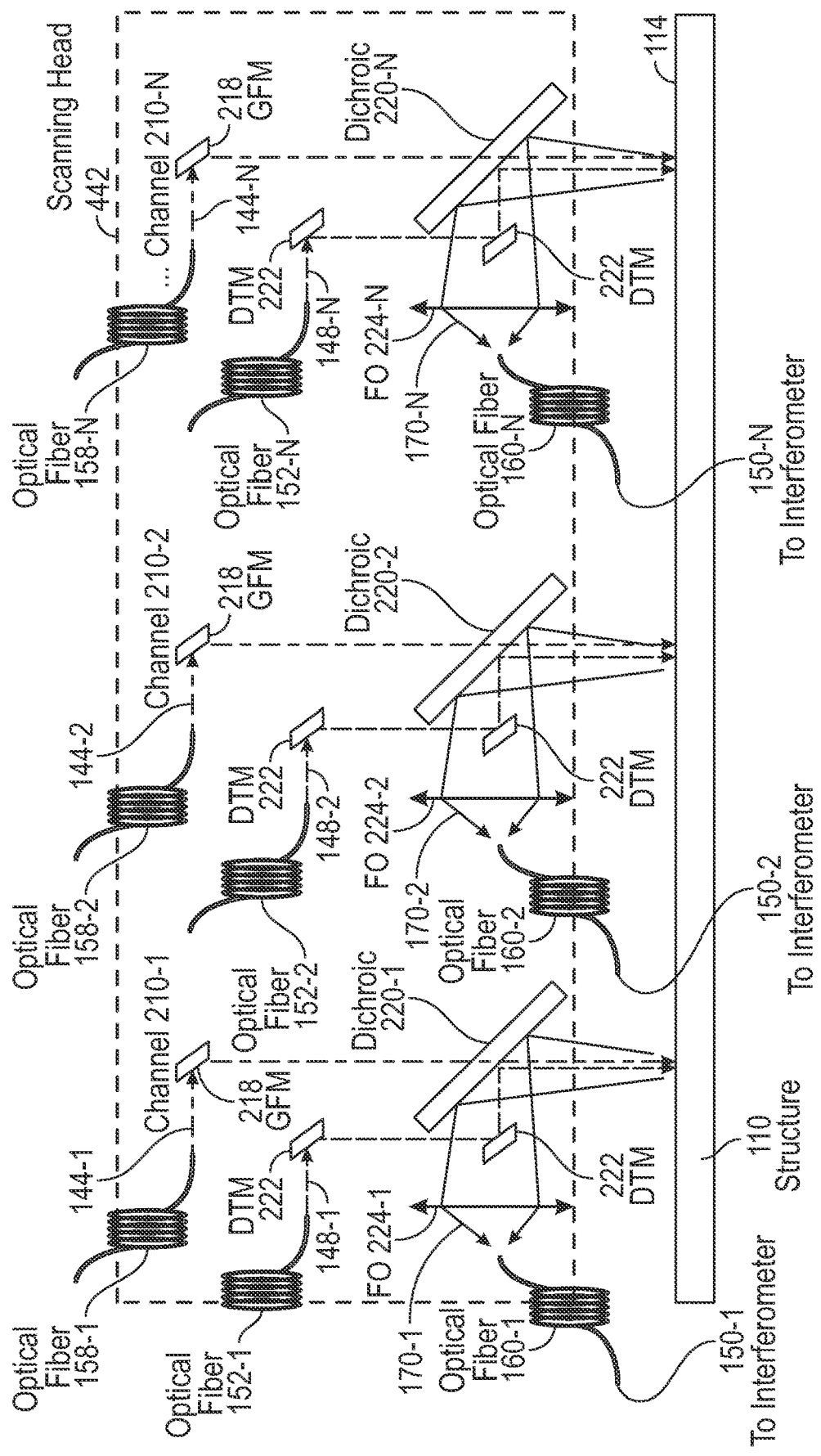
FIG. 4 illustrates another example scanning head for a laser ultrasonic system, according to one embodiment.

FIG. 4 illustrates an example scanning head 442 of a LUT system 102, according to one embodiment. The scanning head 442 is an example implementation of the scanning head 142 illustrated in FIG. 1. Compared to the scanning head 242, the scanning head 442 does not include the laser generator 154 and the laser detector 156. That is, the generation laser light 144 and the detection laser light 148 are not generated within the scanning head 342. For example, as shown in FIG. 4, at least one of the generation laser light 144 emitted from the laser generator 154 or the detection laser light 148 emitted from the laser detector 156 may be split and injected into a number of optical fibers equal to the number of LUT channels 210 in the scanning head 442.

In particular, the generation laser light 144 from the single laser generator 154 is distributed to each of the multiple channels 210 1-N via respective optical fibers 158 1-N. Similarly, the detection laser light 148 from the single laser detector 165 is distributed to each of the multiple channels 210 1-N via respective optical fibers 152 1-N. In this embodiment, each channel 210 is optically uncoupled from the other channels 210.

Note that the embodiments of the scanning head described in FIGS. 2, 3, and 4 are shown as reference examples of scanning heads 142 that may be used within LUT systems, and the scanning head 142 may have different configurations consistent with the functionality described herein. For example, in certain embodiments, a bundle of optical fibers may inject the generation laser light 144 or the detection laser light 148, or both, in a predefined pattern onto a single mirror and single Dichroic. As another example, in certain embodiments, the shape of scanning head 142, or the configuration of its optical components, or both, may be adapted to inspect structures 110 that have surfaces that might be more complex than just flat.

Figure 5:
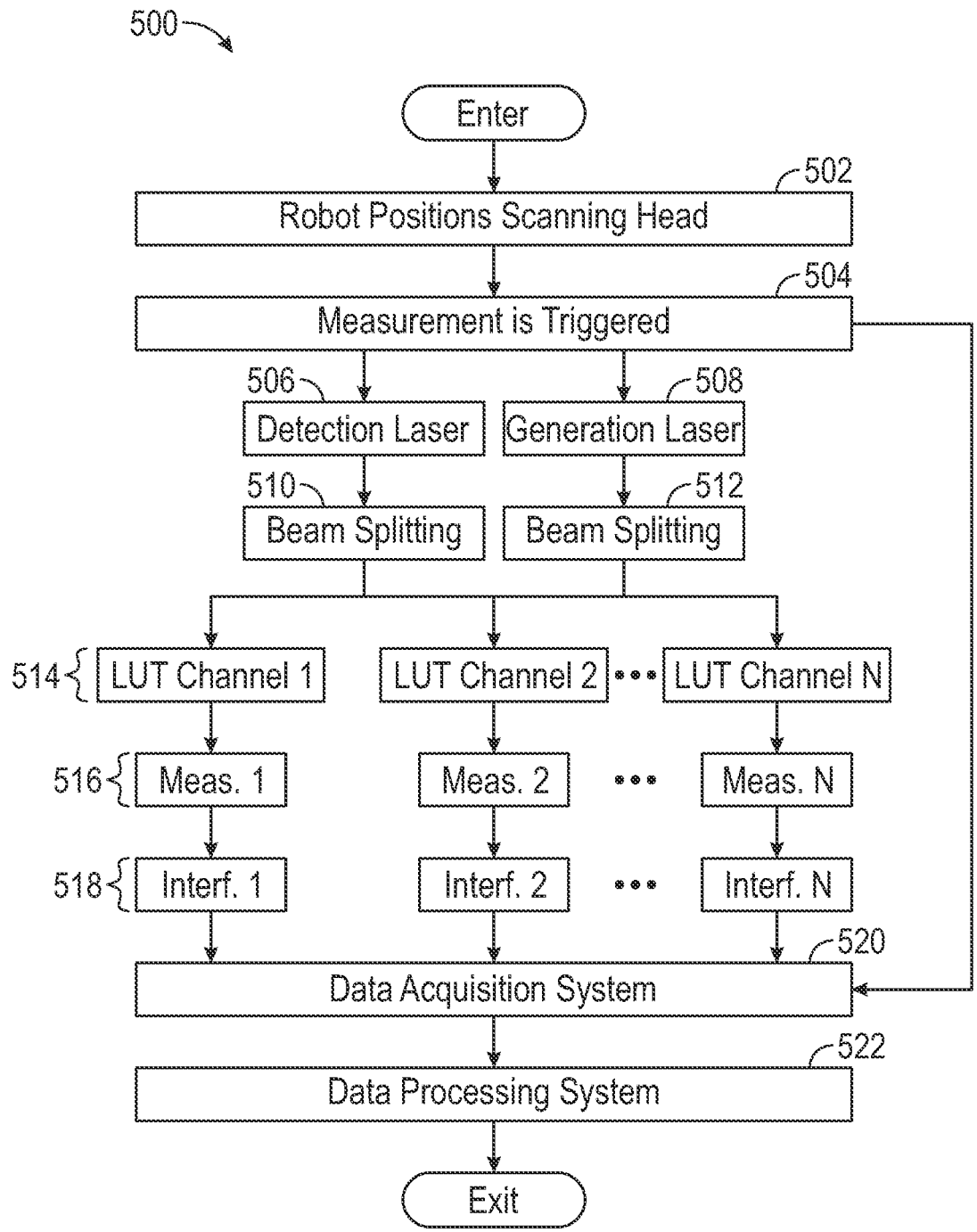
FIG. 5 is a flowchart of a method for performing a laser ultrasonic test to inspect a structure, according to one embodiment.

FIG. 5 is a flowchart of a method 500 for performing a laser ultrasonic test to inspect a structure (e.g., structure 110), according to one embodiment. Method 500 enters with block 502, where a movement apparatus 140 (e.g., robot or gantry) positions the scanning head 142 with respect to the structure 110. When the movement apparatus 140 has the desired position, the laser ultrasonic measurement (including data acquisition system 172) is triggered (block 504). At blocks 506 and 508, the laser generator 154 and laser detector 156 emit respective generation laser light 144 and detection laser light 148.

At blocks 510 and 512, the beams of the generation laser light 144 and detection laser light 148 are split into a number of laser light beams and a number of detection laser light beams, respectively. Each of the number of laser light beams and the number of detection laser light beams may correspond to the number of LUT channels 210. At block 514, each pair of generation laser light beam and detection laser light beam is directed into a respective LUT channel 210.

At block 516, each LUT channel 210 directs its generation laser light beam and detection laser light beam towards the surface 114 of the structure 110 and collects the detection laser light beams reflected by the surface 114 of the structure 110. At block 518, each LUT channel 210 directs collected detection laser light beams to its corresponding interferometer 150. Each interferometer 150 extracts ultrasonic information from the collected light, and sends the ultrasonic information to a data acquisition system 172 (block 520). At block 522, the digitized data of the data acquisition system 172 is sent to a data processing system that adds the data for the current inspection spots to the total inspection data for the current structure 110. If the inspection is not completed, then the method 500 goes to block 502 to position the movement apparatus 140 to the next inspection location.

Figure 6:
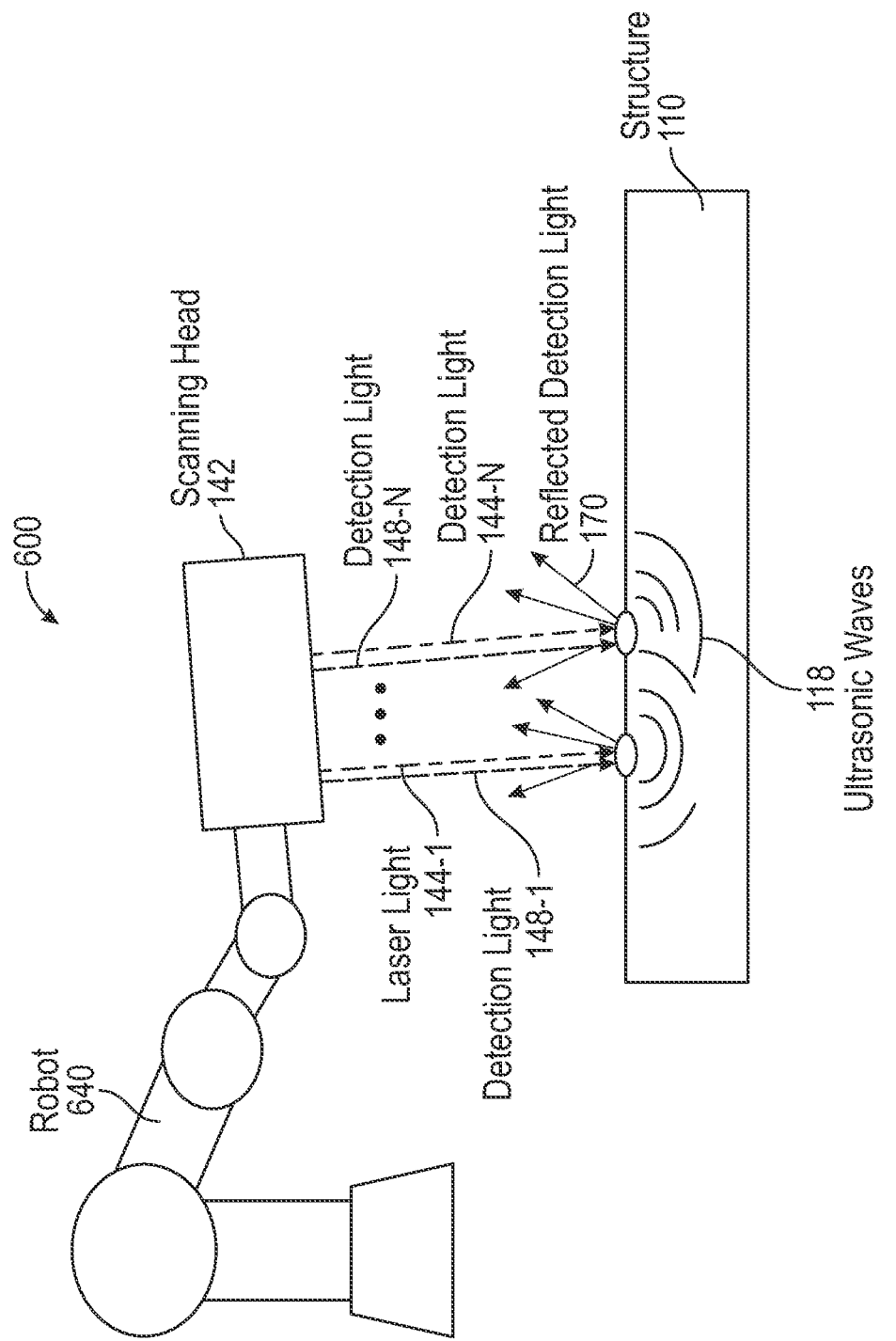
FIG. 6 illustrates an example testing environment, according to one embodiment.

FIG. 6 illustrates an example testing environment 600, according to one embodiment. The testing environment 600 is an example implementation of the testing environment 100 depicted in FIG. 1. Here, the testing environment 600 includes a robot 640, which is used to move the scanning head 142 in relation to the structure 110. The robot 640 is one example implementation of the movement apparatus 140. The scanning head 142 is generally representative of any of the scanning heads described herein, including, for example scanning head 242, 342, and 442.

A further understanding of at least some of the aspects of the present disclosure is provided with reference to the following numbered Clauses, in which:

Clause 1: A system comprising: a laser generator configured to emit generation laser light; a laser detector configured to emit detection laser light; a scanning apparatus configured to: receive the generation laser light and the detection laser light; direct the generation laser light and the detection laser light onto a surface of a structure via a plurality of laser ultrasonic channels; and collect reflections of the detection laser light from the surface of the structure via the plurality of laser ultrasonic channels; and a controller coupled to the laser generator, the laser detector and the scanning apparatus, the controller being configured to characterize an internal feature of the structure based on the reflections.

Clause 2: The system of Clause 1, wherein: the scanning apparatus comprises a plurality of beam splitters and a plurality of dichroics; and in order to direct the generation laser light onto the surface of the structure, each beam splitter is configured to reflect a respective portion of the generation laser light onto the surface of the structure via a respective dichroic of the plurality of dichroics.

Clause 3: The system of Clause 2, wherein each beam splitter is configured to reflect a different portion of the generation laser light onto a different laser ultrasonic channel of the plurality of laser ultrasonic channels.

Clause 4: The system of any of Clauses 1 to 3, wherein the scanning apparatus further comprises a mirror configured to reflect a remaining portion of the generation laser light onto the surface of the structure.

Clause 5: The system of any of Clauses 1 to 4, wherein: the scanning apparatus comprises a plurality of beam splitters, a plurality of first mirrors, and a plurality of dichroics; and in order to direct the detection laser light onto the surface of the structure: each beam splitter is configured to reflect a respective portion of the detection laser light onto a respective dichroic of the plurality of dichroics via a respective one of the plurality of first mirrors; and each respective dichroic is configured to direct the respective portion of the detection laser light onto the surface of the structure.

Clause 6: The system of Clause 5, wherein each beam splitter is further configured to reflect a different portion of the detection laser light onto a different laser ultrasonic channel of the plurality of laser ultrasonic channels.

Clause 7: The system of any of Clauses 5 to 6, wherein the scanning apparatus further comprises a second mirror configured to reflect a remaining portion of the detection laser light onto the surface of the structure.

Clause 8: The system of any of Clauses 5 to 7, wherein in order to collect the reflections of the detection laser light from the surface of the structure, each dichroic is configured to receive a different portion of the reflections of the detection laser light from the surface of the structure.

Clause 9: The system of any of Clauses 1 to 8, further comprising a plurality of interferometers, each interferometer being configured to receive a respective portion of the reflections from a respective laser ultrasonic channel of the plurality of laser ultrasonic channels.

Clause 10: The system of any of Clauses 1 to 9, wherein the scanning apparatus is configured to, for each laser ultrasonic channel of the plurality of laser ultrasonic channels: direct a different portion of the generation laser light to the laser ultrasonic channel via a respective optical fiber of a first plurality of optical fibers; and direct a different portion of the detection laser light to the laser ultrasonic channel via a respective optical fiber of a second plurality of optical fibers.

Clause 11: The system of any of Clauses 1 to 10, wherein the scanning apparatus comprises the laser generator and the laser detector.

Clause 12: The system of any of Clauses 1 to 10, wherein the scanning apparatus is configured to: receive the generation laser light via a first optical fiber and receive the detection laser light via a second optical fiber; direct the generation laser light to a first laser ultrasonic channel of the plurality of laser ultrasonic channels via the first optical fiber; and direct the detection laser light to the first laser ultrasonic channel via the second optical fiber.

Clause 13: The system of any of Clauses 1 to 12, further comprising a movement apparatus configured to move the scanning apparatus relative to the surface of the structure.

Clause 14: A method, comprising: generating, via a first plurality of beam splitters, a plurality of generation laser light beams from an emitted generation laser light; generating, via a second plurality of beam splitters, a plurality of detection laser light beams from an emitted detection laser light; for each of a plurality of laser ultrasonic channels, (i) directing a respective one of the plurality of generation laser light beams and a respective one of the plurality of detection laser light beams to a surface of a structure via the laser ultrasonic channel and (ii) collecting one or more reflections of the respective one of the plurality of detection laser light beams via the laser ultrasonic channel; and characterizing an internal feature of the structure based on the reflections.

Clause 15: The method of Clause 14, wherein the plurality of generation laser light beams and the plurality of detection laser light beams are generated within a scanning apparatus.

Clause 16: The method of any one of Clauses 14 to 15, wherein at least one of the generation laser light or the detection laser light is emitted within the scanning apparatus.

Clause 17: The method of any one of Clauses 14 to 16, wherein the generation laser light is directed to an initial laser ultrasonic channel of the plurality of laser ultrasonic channels via an optical fiber.

Clause 18: The method of any one of Clauses 14 to 17, wherein the detection laser light is directed to an initial laser ultrasonic channel of the plurality of ultrasonic channels via an optical fiber.

Clause 19: The method of any of Clauses 14 to 16, wherein, for each of the plurality of laser ultrasonic channels, the respective one of the plurality of generation laser light beams is directed to the laser ultrasonic channel via a respective first optical fiber and the respective one of the plurality of detection laser light beams is directed to the laser ultrasonic channel via a respective second optical fiber.

Clause 20: A laser ultrasonic system comprising: a scanning head; and a robotic arm coupled to the scanning head, wherein: the scanning head comprises: a laser generator configured to emit generation laser light; and a laser detector configured to emit detection laser light; and the scanning head is configured to: receive the generation laser light and the detection laser light; direct the generation laser light and the detection laser light onto a surface of a structure via a plurality of laser ultrasonic channels; and collect reflections of the detection laser light from the surface of the structure via the plurality of laser ultrasonic channels.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A system comprising:
   a laser generator configured to emit generation laser light;
   a laser detector configured to emit detection laser light;
   a scanning head configured to:
      receive the generation laser light and the detection laser light;
      direct the generation laser light and the detection laser light onto a surface of a structure via a plurality of laser ultrasonic channels; and
      collect reflected detection laser light from the surface of the structure via the plurality of laser ultrasonic channels;
   a plurality of interferometers; and
   a controller coupled to the laser generator, the laser detector, and the interferometers, the controller being configured to characterize an internal feature of the structure based on the reflected detection laser light,
   wherein the scanning head comprises:
      a plurality of generation beam splitters;
      a plurality of detection beam splitters;
      a plurality of detection turning mirrors;
      a plurality of dichroics; and
      a plurality of focusing optics;
   wherein, in order for the scanning head to direct the generation laser light and the detection laser light onto a plurality of locations on the surface of the structure via the plurality of laser ultrasonic channels:
      each one of the plurality of generation beam splitters is configured to reflect a portion of the generation laser light along one of the plurality of laser ultrasonic channels to one of the plurality of dichroics and another portion of the generation laser light to another one of the plurality of generation beam splitters;
      each one of the plurality of detection beam splitters is configured to reflect a portion of the detection laser light along one of the plurality of laser ultrasonic channels to one of the plurality of detection turning mirrors and another portion of the detection laser light to another one of the plurality of detection beam splitters;

each one of the plurality of detection turning mirrors is configured to reflect the portion of the detection laser light along the one of the plurality of laser ultrasonic channels to the one of the plurality of dichroics; and each one of the plurality of dichroics is configured to reflect the portion of the generation laser light along the one of the plurality of laser ultrasonic channels to one of the plurality of locations on the surface of the structure and the portion of the detection laser light along the one of the plurality of laser ultrasonic channels to the one of the plurality of locations on the surface of the structure; and wherein, in order for the scanning head to collect the reflected detection laser light from the plurality of locations on the surface of the structure via the plurality of laser ultrasonic channels:

each one of the plurality of dichroics is configured to reflect a portion of the reflected detection laser light from the one of the plurality of locations on the surface of the structure along the one of the plurality of laser ultrasonic channels to one of the plurality of focusing optics; and each one of the plurality of focusing optics is configured to reflect the portion of the reflected detection laser light along the one of the plurality of laser ultrasonic channels to one of the plurality of interferometers.

2. The system of claim 1, wherein each one of the plurality of generation beam splitters is configured to reflect a different portion of the generation laser light onto a different laser ultrasonic channel of the plurality of laser ultrasonic channels.

3. The system of claim 1, wherein each one of the plurality of dichroics is configured to receive a different portion of the reflected detection laser light from a different one of the plurality of locations on the surface of the structure.

4. The system of claim 1, wherein each one of the plurality of interferometers is configured to receive a respective portion of the reflected detection laser light from a respective one of the plurality of dichroics along a respective laser ultrasonic channel of the plurality of laser ultrasonic channels.

5. The system of claim 1, wherein the laser generator and the laser detector are remote from and optically coupled to the scanning head.

6. The system of claim 5, wherein the scanning head is configured to:
receive the generation laser light from the laser generator via a first optical fiber; and
receive the detection laser light from the laser detector via a second optical fiber.

7. The system of claim 1, further comprising a movement apparatus configured to move the scanning head relative to the surface of the structure.

8. The system of claim 1, wherein each one of the plurality of detection beam splitters is configured to reflect a different portion of the detection laser light onto a different laser ultrasonic channel of the plurality of laser ultrasonic channels.

9. The system of claim 1, wherein the laser generator and the laser detector are coupled directly to the scanning head.

10. A method, comprising:
receiving, by a scanning head, generation laser light;
receiving, by the scanning head, detection laser light;
directing the generation laser light and the detection laser light onto a plurality of locations on a surface of a structure via a plurality of laser ultrasonic channels by:
reflecting, by each one of a plurality of generation beam splitters, a portion of the generation laser light along an associated one of the plurality of laser ultrasonic channels to an associated one of a plurality of dichroics and another portion of the generation laser light to another one of the plurality of generation beam splitters;
reflecting, by each one of a plurality of detection beam splitters, a portion of the detection laser light along an associated one of the plurality of laser ultrasonic channels to an associated one of a plurality of detection turning mirrors and another portion of the detection laser light to another one of the plurality of detection beam splitters;
reflecting, by each one of a plurality of detection turning mirrors, the portion of the detection laser light along the associated one of the plurality of laser ultrasonic channels to the associated one of the plurality of dichroics; and
reflecting, by each one of the plurality of dichroics, the portion of the generation laser light along the associated one of the plurality of laser ultrasonic channels to an associated one of the plurality of locations on the surface of the structure and the portion of the detection laser light along the associated one of the plurality of laser ultrasonic channels to the associated one of the plurality of locations on the surface of the structure;
collecting reflected detection laser light from each one of the plurality of locations on the surface of the structure via the plurality of laser ultrasonic channels by:
reflecting, by each one of the plurality of dichroics, a portion of reflected detection laser light from the associated one of the plurality of locations on the surface of the structure along the associated one of the plurality of laser ultrasonic channels to an associated one of a plurality of focusing optics; and
reflecting, by each one of the plurality of focusing optics, the portion of the reflected detection laser light along the associated one of the plurality of laser ultrasonic channels to an associated one of a plurality of interferometers; and
characterizing an internal feature of the structure based on the reflected detection laser light.

11. The method of claim 10, wherein the generation laser light and the detection laser light are generated within the scanning head.

12. The method of claim 10, wherein one of the generation laser light or the detection laser light is generated within the scanning apparatus head.

13. The method of claim 10, wherein the generation laser light is directed to the scanning head via an optical fiber.

14. The method of claim 10, wherein the detection laser light is directed to the scanning head via an optical fiber.

15. The method of claim 10, wherein a plurality of portions of the reflected detection laser light is directed to each one of the plurality of interferometers via a plurality of optical fibers.

16. The method of claim 10, further comprising forming each one of the plurality of laser ultrasonic channels comprising associated ones of the generation beam splitters, detection beam splitters, detection turning mirrors, dichroics, and focusing optics.

17. A laser ultrasonic scanning system comprising:
a scanning head comprising:
- a plurality of generation beam splitters configured to receive generation laser light from a laser generator;
- a plurality of detection beam splitters configured to receive detection laser light from a laser detector;
- a plurality of detection turning mirrors, each in optical communication with one of the plurality of detection beam splitters;
- a plurality of dichroics, each in optical communication with one of the plurality generation beam splitters and one of the plurality of detection turning mirrors; and
- a plurality of focusing optics, each in optical communication with one of the plurality of dichroics, wherein associated ones of the generation beam splitters, detection beam splitters, detection turning mirrors, dichroics, and focusing optics form each one of a plurality of laser ultrasonic channels;

wherein in order for the scanning head to direct the generation laser light and the detection laser light onto a plurality of locations on the surface of the structure via the plurality of laser ultrasonic channels:
- each one of the plurality of generation beam splitters is configured to reflect a portion of the generation laser light along one of the plurality of laser ultrasonic channels to one of the plurality of dichroics and another portion of the generation laser light to another one of the plurality of generation beam splitters;
- each one of the plurality of detection beam splitters is configured to reflect a portion of the detection laser light along one of the plurality of laser ultrasonic channels to one of the plurality of detection turning mirrors and another portion of the detection laser light to another one of the plurality of detection beam splitters;
- each one of the plurality of detection turning mirrors is configured to reflect the portion of the detection laser light along the one of the plurality of laser ultrasonic channels to the one of the plurality of dichroics; and
- each one of the plurality of dichroics is configured to reflect the portion of the generation laser light along the one of the plurality of laser ultrasonic channels to one of the plurality of locations on the surface of the structure and the portion of the detection laser light along the one of the plurality of laser ultrasonic channels to the one of the plurality of locations on the surface of the structure; and wherein, in order for the scanning head to collect the reflected detection laser light from the plurality of locations on the surface of the structure via the plurality of laser ultrasonic channels:
- each one of the plurality of dichroics is configured to reflect a portion of the reflected detection laser light from the one of the plurality of locations on the surface of the structure along the one of the plurality of laser ultrasonic channels to one of the plurality of focusing optics; and
- each one of the plurality of focusing optics is configured to reflect the portion of the reflected detection laser light along the one of the plurality of laser ultrasonic channels to one of the plurality of interferometers.

18. The system of claim 17, wherein the scanning head is configured to:
- receive the generation laser light from the laser generator via a first optical fiber; and
- receive the detection laser light from the laser detector via a second optical fiber.

19. The system of claim 17, further comprising further comprising a movement apparatus configured to move the scanning head relative to the surface of the structure.

20. The system of claim 17, further comprising a data acquisition system configured to extract and analyze ultrasonic signals from the reflected detection laser light.

* * * * *